United States Patent [19]

Shimizu

[11] 3,787,116

[45] Jan. 22, 1974

[54] EXPOSURE CONTROLS FOR MOTION PICTURE CAMERAS

[75] Inventor: Tatsuro Shimizu, Tokyo, Japan

[73] Assignee: Asahi Kogaku Kogy Kabushiki Kaisha, Tokyo-to, Japan

[22] Filed: Dec. 8, 1972

[21] Appl. No.: 313,514

[52] U.S. Cl.............................. 352/141, 352/216
[51] Int. Cl. ............................................ G03b 7/08
[58] Field of Search........................... 352/141, 216

[56] References Cited
UNITED STATES PATENTS
2,252,573  8/1941  Leitz................................. 352/141

Primary Examiner—Monroe H. Hayes
Attorney, Agent, or Firm—Harold D. Steinberg et al.

[57] ABSTRACT

A motion picture camera which has an adjustable diaphragm capable of being automatically adjusted by a drive which operates in response to a change in the light received by a light-responsive structure. The camera includes a rotary shutter having an opening through which film in the camera is exposed as well as an adjusting plate coaxial with the rotary shutter so that when the shutter and adjusting plate are turned one with respect to the other the size of the shutter opening can be adjusted. A suitable adjusting structure is operatively connected with the shutter and adjusting plate for turning them one with respect to the other to adjust the shutter opening, and this adjusting structure is driven from the drive which adjusts the diaphragm, so that when the diaphragm is adjusted the shutter opening is also adjusted.

12 Claims, 16 Drawing Figures

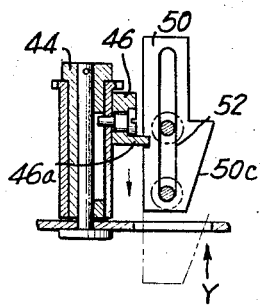
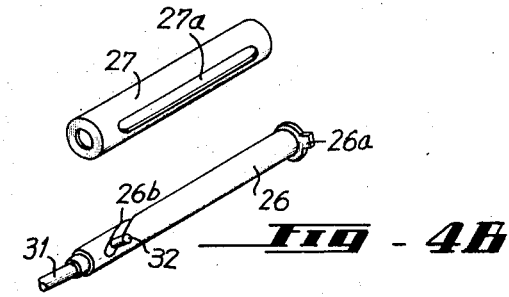
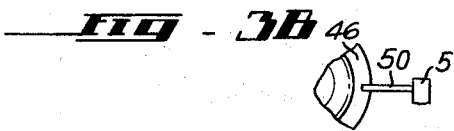
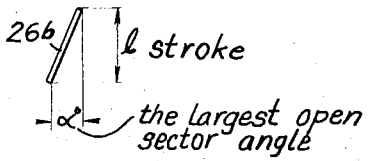
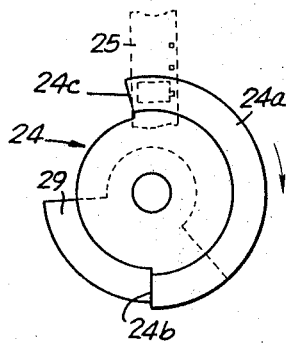
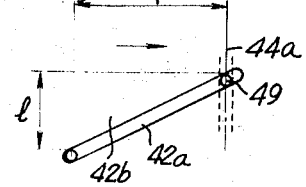
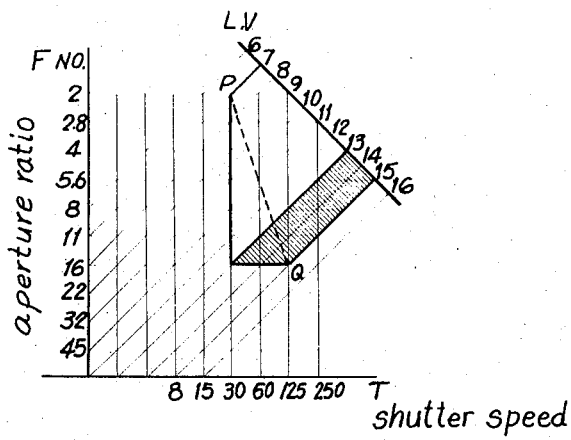

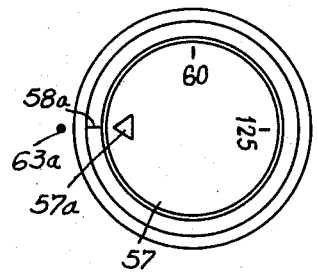
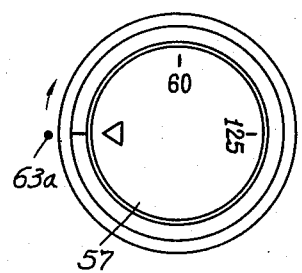
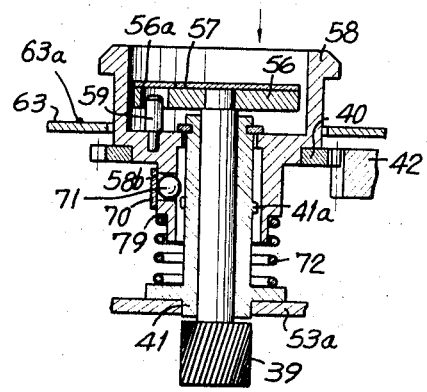
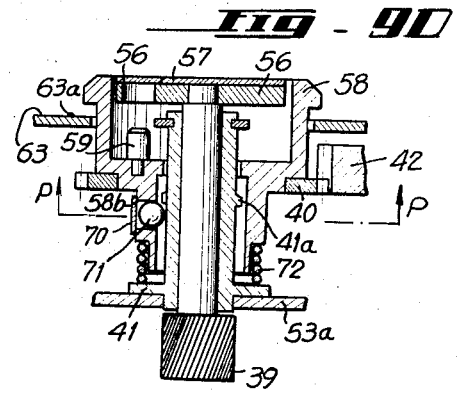
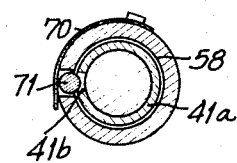

3,787,116

EXPOSURE CONTROLS FOR MOTION PICTURE CAMERAS

BACKGROUND OF THE INVENTION

The present invention relates to cameras.

In particular, the present invention relates to motion picture cameras, especially the type which are capable of having their diaphragms automatically adjusted in response to changes in lighting conditions.

Conventional cameras of this type, particularly relatively small-size motion picture cameras, have certain operating limitations. Thus, with cameras of this type the diaphragm aperture is limited to an F-number of 16. The reason for this is that images which are formed at smaller diaphragm settings deteriorate due to diffraction phenomena caused during filing of an object in a field of great brightness with such small apertures. However, such motion picture cameras are often used precisely under these conditions where an object is photographed under conditions of relatively great brightness. Thus, where an object is in an atmosphere of relatively great light intensity and must be photographed with conventional cameras of the above type, it is necessary for the operator to carry out undesirable operations such as applying a suitable filter, such as an ND filter, for example, reducing the opening at the sector angle of the shutter where the latter is made up of a pair of vanes which can be angularly adjusted with respect to each other, increasing the shutter speed and the like.

SUMMARY OF THE INVENTION

It is accordingly a primary object of the present invention to provide a motion picture camera of the above general type which will avoid the above drawbacks.

In particular, it is an object of the present invention to provide a motion picture camera which is capable of automatically reducing the shutter opening when the diaphragm setting is reduced in response to photographing an object in bright light.

Thus, it is an object of the invention to provide a camera which is capable of making proper exposures automatically in a range of brightness larger than the range of brightness in which it has heretofore been possible to obtain proper exposures.

However, it is also an object of the present invention to provide a construction which makes it possible for the operator to manually adjust the shutter opening, if desired, at a relatively small aperture of the diaphragm.

In particular, it is an object of the present invention to provide a motion picture camera of the above general type with the possibility of making proper exposures through a range of light values greater than has heretofore been possible even when the diaphragm is set at a relatively small aperture such as that corresponding to an F-number of 16.

Furthermore, it is an object of the present invention to provide a construction of the above type which is made up of simple ruggedly constructed elements which are inexpensive to manufacture and assemble and which will operate reliably to achieve the desired results.

In accordance with the present invention the motion picture camera has an adjustable diaphragm means and a drive means which is operatively connected to the adjustable diaphragm means for adjusting the latter. A light-responsive means is operatively connected with the drive means for actuating the latter to adjust the diaphragm means in response to change in lighting conditions. A rotary shutter means is formed with an opening through which film is exposed at each revolution of the shutter means. An adjusting means is operatively connected with this rotary shutter means for adjusting the size of the opening thereof. A transmission means is operatively connected on the one hand with the drive means and on the other hand with the adjusting means for actuating the latter to adjust the opening of the shutter means when the drive means is actuated to adjust the diaphragm means.

BRIEF DESCRIPTION OF DRAWINGS

The invention is illustrated by way of example in the accompanying drawings which form part of this application and in which:

FIG. 3A is a fragmentary sectional elevation showing part of an automatic compensating structure of the camera of the invention, FIG. 3A showing part of the structure of FIG. 1 as it appears when viewed in the manner indicated by the arrow X;

FIG. 3B is a fragmentary view from the bottom of the structure of FIG. 3A as seen in the direction of arrow Y of FIG. 3A;

FIG. 4A is a perspective illustration of one of a pair of telescoped tubes which form part of a shutter adjusting means;

FIG. 4B is a perspective illustration of another part of the adjusting means which is received in the interior of the adjusting means shown in FIG. 4A;

FIG. 5 is a schematic representation of a helical slot forming part of the structure of FIG. 4B;

FIG. 6 is a schematic plan view of the rotary shutter of the invention and part of the adjusting means which cooperates therewith;

FIG. 7 is a schematic representation of part of a transmission means which operates the shutter adjusting means;

FIG. 8 is a graph illustrating the effect which is achieved with the present invention;

FIGS. 9A–9E are various views of a clutch means of the invention capable of being incorporated into the structure of FIGS. 1 and 2, the clutch means being shown in its engaged and disengaged positions respectively in FIGS. 9C and 9D, while FIGS. 9A and 9B are top plan views of the structure shown in FIGS. 9C and 9D, respectively, and FIG. 9E is a sectional plan view taken along line P—P of FIG. 9D in the direction of the arrows.

DESCRIPTION OF PREFERRED EMBODIMENTS

According to the present invention it is possible to achieve automatic exposure of film, providing good photographs, in a highly accurate manner, without requiring any of the drawbacks of the prior art as referred to above. Thus, for example, if the shutter speed is 1/30 sec. and the F-number of the diaphragm is between 2 and 16 with the shutter set at the largest opening provided by the sector angle in the shutter, then the light values LV can be between 7 and 13 in accordance with the relationship between the shutter speed, the F-number of the diaphragm, and the light values as shown in the graph of FIG. 8. However, if the opening of the sector angle of the shutter is made 1/4 smaller, the shutter speed can be reduced to 1/125 sec., and thus it is possible, as shown in FIG. 8, to achieve a light value LV of 15 at the F-number 16 of the diaphragm. In this way the range of brightness can be four times larger, as indicated by the shaded area of the graph of FIG. 8.

In accordance with the present invention the shutter of the camera is automatically regulated to achieve shutter speeds or exposure times as shown in FIG. 8 with these shutter speeds or exposure times having with respect to the F-numbers the relationship indicated by the dotted curve PQ in FIG. 8. Thus it will be noted that with the present invention when the aperture setting of the diaphragm has an F-number of 16, the exposure time will be 1/125. In this way it is possible to achieve an automatic regulation of the amount of light reaching the film so that this amount of light is reduced at small apertures, and in this way it is possible to increase the range of light in which it is possible to make exposures without any undesirable manual or mechanical operations being required. Thus it is possible with the invention to achieve fully accurate exposures in a range of brightness larger than has heretofore been possible without sacrificing the possibility of reducing the size of the aperture of the diaphragm.

Figure 1:
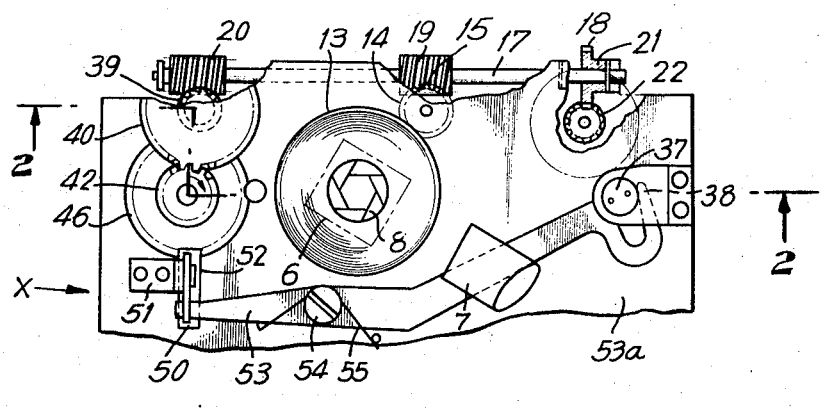
FIG. 1 is a fragmentary schematic elevation showing that part of the camera of the invention which includes the structure of the invention as it appears when looking toward part of the objective of the camera, the plane of FIG. 1 being taken normal to the optical axis of the objective and a zoom lens of the camera being omitted from FIG. 1 to show more clearly the structure behind the zoom lens part of the objective.
Figure 2:
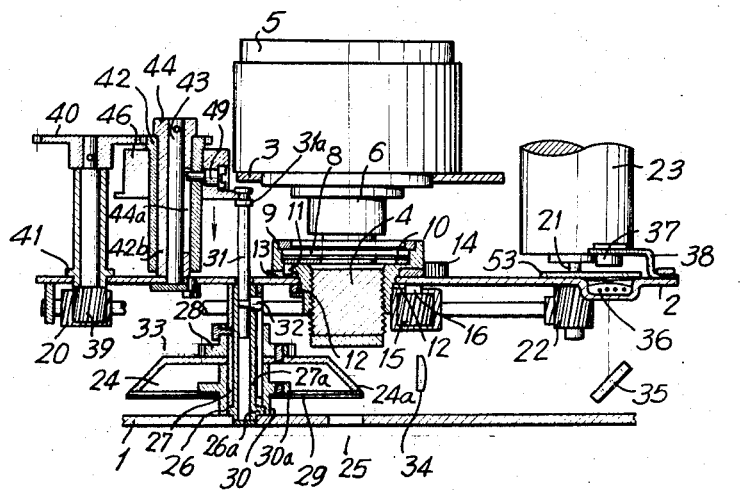
FIG. 2 is a schematic fragmentary sectional elevation taken along line 2—2 of FIG. 1 in the direction of the arrows and showing the zoom lens which does not appear in FIG. 1.

Referring to FIGS. 1 and 2, there is illustrated therein one possible structure for achieving the results of the invention as described above and illustrated in FIG. 8. Thus, there is schematically shown at the lower part of FIG. 2 the film 25 which is situated in the film plane behind a film gate or exposure aperture which is formed at the interior wall 1 of the camera. In front of the wall 1 the camera includes an outer wall 3, and between the outer wall 3 and the inner wall 1 there is an intermediate wall 53a which is shown also in FIG. 1 and which is parallel to the walls 1 and 3, all of these walls being interconnected with each other so as to remain in the position illustrated in FIG. 2 with respect to each other in any suitable way. The outer wall or front wall 3 of the camera carries the zoom lens part 5 of the objective of the camera. Part of the light which travels along the optical axis through the zoom lens part 5 of the objective reaches a beam-splitter type of prism 6 through which the light can continue to travel along the optical axis while part of the light is reflected by the prism 6 to the viewfinder 7 which is schematically shown in FIG. 1. The light which continues to travel along the optical axis through the beam-splitter 6 travels through the diaphragm 8 which is shown schematically in FIG. 1 and then reaches the main lens 4 of the objectives, this lens 4 being schematically represented in FIG. 2. Thus, the light travels first through the zoom lens part 5 of the objective and then through the main lens portion 4 thereof before reaching the film 25 in order to expose the latter. The main lens 4 has a threaded mounting in a frame 9 which is fixedly carried by and extends through an opening in the intermediate wall 53a. The diaphragm 8 is housed within the frame 9 in a known manner and is capable of being adjusted also in a known manner in response to rotary movement of a ring 10 which is pivotally connected with the swingable blades of the diaphragm and which is fixed with a pin 11 received in an opening of a rotary gear 13. The rotary gear 13 is supported on the plate 53a for free rotary movement between the plate and the part of the frame 9 which is situated in front of the gear 13, as shown in FIG. 2, and the frame 9 is formed with an arcuate slot through which the pin 11 extends so that in response to turning of the gear 13 the diaphragm will be adjusted. The gear 13 meshes with a gear 14 so that in response to turning of the gear 14 the diaphragm will be adjusted. A fastening ring 12 surrounds the frame 9 at its portion which is situated behind the intermediate wall 53a, for fixing the frame 9 to the wall 53a.

The wall 53a supports a servomotor 23 which forms part of a drive means operatively connected with the diaphragm means 8 for adjusting the latter. This drive means of course includes the gears 13 and 14 as well as the components 10 and 11. In addition the drive means includes the shaft 21 of the servomotor 23. This shaft 21 is fixed with a helical gear 22 which meshes with a second helical gear 18 of the drive means, the axes of the gears 22 and 18 being perpendicular to each other, and the gear 18 is fixed to a rotary shaft 17 of the drive means. This shaft 17 is supported for rotary movement in any suitable way and carries a helical gear 19 of the drive means. The helical gear 19 in turn meshes with a perpendicular helical gear 15 which in turn is coaxially fixed with the gear 14, these gears 14 and 15 being supported for rotary movement by a bearing 16 carried by the wall 53a. Thus, in this way the drive means formed by the above transmission elements is operatively connected with the diaphragm means 8 for adjusting the latter. If desired element 22 may take the form of a worm while element 18 may be take the form of a worm wheel, and of course element 19 may also be a worm while element 15 can then be a worm wheel.

As is shown in FIGS. 2 and 6, the camera structure includes a rotary shutter means 24 formed with an opening extending arcuately between the edges 24b and 24c of the rotary shutter as illustrated in FIG. 6. This rotary shutter means 24 is rotated about its axis at a constant speed by a constant speed driving motor referred to below, and thus at each revolution film will be exposed when the opening extending between edges 24b and 24c is over the film gate behind which the film 25 is located. It is apparent that when the shutter opening extending between edges 24b and 24c is completely unobstructed the longest exposure time will be provided. When this opening is reduced the exposure time is also reduced. In order to adjust the opening of the shutter an adjusting means is provided, this adjusting means including the adjusting plate 29 which is coaxial with the rotary shutter means. The shutter means 24 and the plate 29 are capable of being adjusted angularly about their common axis one with respect to the other so that only a predetermined size will be provided for the shutter opening, and it will be noted that in the position of the adjusting plate 29 and shutter 24 shown in FIG. 6 the shutter opening has been reduced approximately by half. Thus, as the size of the shutter opening is reduced by turning of the plate 29 in a clockwise direction with respect to the shutter 24, as viewed in FIG. 6, the exposure time is also reduced. Thus, in accordance with the invention, as has been indicated above, the adjusting means, part of which is formed by the adjusting plate 29, is operatively connected with the drive means which adjusts the diaphragm means by way of a transmission means which automatically adjusts the opening of the shutter means when adjustment is made at the aperture of the diaphragm, this adjustment being made in accordance with the dotted curve PQ shown in FIG. 8, as described above.

This transmission means which adjusts the shutter opening simultaneously with the adjustment of the aperture of the diaphragm by the drive means includes a continuation of the shaft 17 where the latter extends to the left beyond the gear 19, as viewed in FIG. 1. This part of the shaft 17 fixedly carries a helical gear 20 which thus rotates at the same speed as the gear 19. The gear 20 of the transmission means meshes with a helical gear 39 which is perpendicular to the gear 20. FIG. 2 shows at the lower left part of the frame structure which supports the shaft 17 for rotary movement. The intermediate wall 53a fixedly carries a tubular bearing 41 in which there is supported for rotary movement an elongated shaft which is fixed to and extends from the gear 39 and which is fixed at its upper end, as viewed in FIG. 2, to a driving gear 40 of the transmission means. This driving gear 40 meshes with a driven gear 42 which is fixed to an elongated rotary tube 42b, as by being formed integrally therewith. This elongated rotary tube 42b is formed with a helical slot 42a passing through its wall, this slot 42a being schematically illustrated in FIG. 7. The rotary tube 42b is supported for rotary movement on a stationary member in the form of a tube 44 which is coaxial with and extends through the rotary tube 42b, this tube 44 in turn being fixedly mounted on a shaft 43 which is fixed to and projects perpendicularly from the wall 53a in the manner shown in FIG. 2. The stationary tube 44 is formed in its wall with an axial slot 43a which intersects or extends across the helical slot 42a, as shown schematically in FIG. 7.

A pin 49 extends transversely through the helical slot 42a into the axial slot 44a, and this pin 49 of the transmission means is carried by a slide block 46 which forms the output member of the transmission means. This slide block 46 has a portion extending into a groove 31a formed in a plunger 31 of the shutter adjusting means which is described in greater detail below. Thus, the portion of the output member or slide block 46 which is received in the groove 31a is in the form of a flange situated at the periphery of the slide block 46. This slide block 46 is formed with a central opening through which the rotary tube 42b slidably extends. As will be apparent from FIG. 7, when the rotary tube 42b is rotated the helical slot 42a will turn with respect to the axial slot 44a, thus causing the transverse pin 49 to be axially displaced through the stroke 1 indicated in FIG. 7. The horizontal distance between the end positions of the transverse pin 49, as indicated in FIG. 7, is a developed illustration of the degree of angular turning of the rotary tube 42b, and this degree of angular turning corresponds to the range through which it is possible to adjust the angular opening of the shutter. Thus, in response to rotary movement of the tube 42b when it is driven by the gears 40 and 42, the slide block 46 will be axially displaced, and this axial displacement of the slide block 46 will result in adjusting of opening of the shutter. A part of the flange 46a of the slide block 46 is shown in FIG. 3A in connection with another structure, but it is this flange 46a which is received in the groove 31a of the plunger 31.

Figure 10:
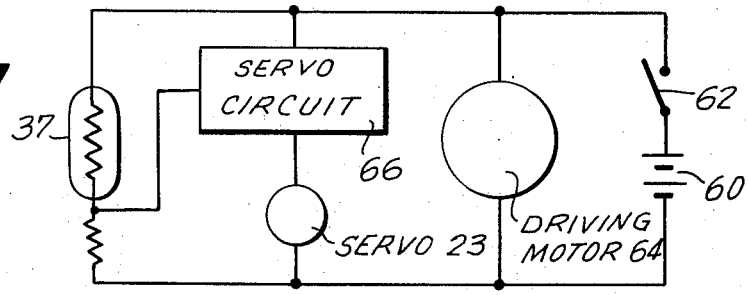
FIG. 10 is a simplified wiring diagram of the camera of the invention.

As is indicated in FIGS. 2 and 6, the rotary shutter means has a tapered surface portion 24a which forms part of a cone and which reflects light which is blocked from reaching the film to a light-responsive means which operates the servomotor 23. This light-reflecting surface 24a of the rotary shutter forms part of a light-directing means which includes a lens 34 and a mirror 35 for directing the light through a lens 36. The light which travels through this light-directing means is received by a light-responsive means 37 carried on the plate 53a by way of a bracket 38. This light-responsive means 37 may take the form of a suitable photocell, cadmium sulfide element, or the like, which responds to changes in light so as to control the operation of the servomotor 23. Thus, referring to FIG. 10, it will be seen that the light-responsive means 37 is connected into an electrical circuit which includes as a source of power a battery unit 60 and a manually operable switch 62 capable of being closed in order to operate the camera. Connected into the circuit is a driving motor 64 which rotates the shutter at a constant speed in a manner described in greater detail below. Also connected into the circuit is the servomotor 23 which is automatically operated by a circuit 66 schematically shown by the block in FIG. 10. In a well known manner, when the light received by the light-responsive means 37 changes, the circuit 66 will operate to produce a corresponding operation of the motor 23 and thus bring about adjustment of the diaphragm and also adjustment of the shutter.

As was indicated above, the adjusting means for adjusting the opening of the shutter 24 includes the rotary adjusting plate 29. The adjusting means further includes a tube 26 which is shown in FIG. 4B. This tube 26 is supported for free rotary movement between the plates 1 and 53a and carries next to the inner plate 1 of the camera a radial tooth or projection 26a received in a notch or opening of a tube 30 which has a flange 30a overlapping and fixed to the plate 29 as shown most clearly in FIG. 2. For this purpose the flange 30a carries a pin which is fixed with the plate 29. Thus, the tube 26 and the tube 30 are constrained to rotate together and of course the plate 29 is constrained to rotate together with the tubes 26 and 30. The tubes 26 and 30 define between themselves an axially extending tubular space which receives part of a tube 27 in which the tube 26 is telescopically received. The tube 27 extends through and is fixed in the manner shown in FIG. 2 to a gear 28 which is itself fixed, in the manner shown in FIG. 2, to the rotary shutter means 24, so that the parts 24, 27, and 28 are constrained to rotate together. The gear 28 meshes with a gear 33 shown schematically in FIG. 2, and this gear 33 forms part of a transmission from the constant speed driving motor 64, so that in this way the shutter is rotated at a constant speed.

The plunger 31 extends through an opening in the plate 53a into the inner tube 26 of the pair of telescoped tubes 26 and 27, in the manner shown in FIGS. 2 and 4B, and this plunger 31 of the adjusting means carries a transverse pin 32 which extends transversely through the helical slot 26b formed in the inner telescoped tube 26 into an axial slot 27a which is formed in the outer telescoped tube 27. This slot 27a is shown most clearly in FIG. 4A. Thus, as the slide block 46, which forms the output member of the transmission means, moves axially along the rotary tube 42b, in the manner described above, its flange 46a, by engaging in the groove 31a of the plunger 31, will axially displace the plunger 31 shown by the arrow in FIG. 2 just to the left of the plunger 31. This will result in axial movement of the pin 32, and while the pin 32 moves axially along the slot 27a of the outer telescoped tube 27 it also coacts with the helical slot 26b of the inner telescoped tube 26 in order to rotate the inner tube 26 with respect to the outer tube 27. In this way the angular positions of the telescoped tubes 26 and 27 will be adjusted with respect to each other in accordance with the axial position of the plunger 31, and since the tubes 26 and 27 are respectively fixed with the adjusting plate 29 and the shutter 24, the adjusting plate 29 and shutter 24 are also angularly adjusted with respect to each other so as to provide in this way an adjustment of the opening extending between the edges 24b and 24c of the shutter. At the same time, in response to rotary movement of the gear 28, the entire shutter means 24 together with the adjusting means which adjusts the opening thereof will rotate as a unit, so that during operation of the camera the shutter 24 together with the plate 29, assuming that the plunger 31 does not move axially, will rotate together as one unit with the telescoped tubes and plunger 31 rotating together with this unit. At this time the plunger 31 rotates at its groove 31a with respect to the flange of the slide block 46. At the same time, even though the entire shutter mechanism and adjusting structure for the latter can rotate as one unit it is possible to axially move the plunger 31 by way of the transmission means of the invention so as to adjust the angular position of the shutter 24 and the adjusting plate 29 one with respect to the other. FIG. 5 shows schematically how the slot 26b formed in the inner telescoped tube 26 provides for an axial stroke 1 for the transverse pin 32 and the plunger 31, this axial stroke providing the angular adjustment $\alpha$ indicated also in FIG. 5.

It is thus apparent from the structure described above and shown in the drawing that as the drive means which includes the servomotor 23 is actuated by the light-responsive means 37 to reduce the size of the aperture provided by the diaphragm means 8, the transmission means will move the plunger 31 downwardly in order to produce a corresponding adjustment of the shutter, and the structure operates in such a way that as the light increases the diaphragm aperture is reduced and simultaneously the plate 29 is turned in a clockwise direction, as shown by the arrow in FIG. 6, with respect to the shutter 24 so that the shutter opening always has with respect to the diaphragm a predetermined size providing the exposure times indicated in FIG. 8 by the dotted curve PQ, with the corresponding light values LV. A feedback type of compensating means is included in the camera for covering the light-responsive means 37 to an increasing extent in response to an increase in light received by the light-responsive means 37, so that in this way the extent to which the servomotor 23 operates will be determined by the change in the amount of light which is received by the light-responsive means. This compensating means includes the swingable compensating plate 53 shown in FIG. 1 over the intermediate plate 53a. The swingable plate or lever 53 is supported for swinging movement on a pin or screw 54 which is carried by the plate 53a and around which is wound a spring 55 which seeks to turn the compensating lever 53 in a clockwise direction, as viewed in FIG. 1. The right end of the compensating plate or lever 53 is in the form of a V-shaped diaphragm aperture which enables the compensating plate 53 to cover or interrupt the travel of the light to the light-responsive means 37 to an increasing extent as the lever 53 swings in a counterclockwise direction about the pivot 54 as viewed in FIG. 1. The left end of the lever 53, as viewed in FIG. 1, engages an inclined camming edge 50c of a cam 50 which is shown most clearly in FIG. 3A. The manner in which the compensating lever 53 coacts with the camming edge 50c is shown most clearly in FIG. 3B. The compensating cam 50 is formed with a slot 52 through which stationary guide pins extend so as to guide the cam 50 for movement in a direction parallel to the plunger 31. FIG. 1 shows a bracket 51 which carries the pins which extend through the guide slot 52. As is shown in FIG. 3A, the left edge of the cam 50 is formed with a notch which receives part of the flange 46a of the slide block 46, so that as a result the cam 50 is constrained to move in the same way as the plunger 31. As the plunger 31 moves downwardly to reduce the size of the shutter opening, as described above, the cam 50 will also move downwardly, as viewed in FIG. 3A, thus providing counterclockwise swinging of the compensating lever 53, as viewed in FIG. 1, and thus gradually cutting down on the amount of light received by the light-responsive means 37. In this way in accordance with the intensity of the light received by the light-responsive means 37, there will be a corresponding extent of operation of the drive means which includes the servomotor 23 and thus the diaphragm will have its aperture correspondingly reduced and the opening of the cutter will be correspondingly changed.

While the structure described above and shown in the drawings will operate to achieve the results of the invention, it may be desirable under certain circumstances to provide the operator of the camera with the possibility of manually setting the exposure time. For this purpose the transmission means may include a clutch means the details of which are shown in FIGS. 9A–9E. For this purpose the rotary helical gear 39 of the transmission means, which is driven from the helical gear 20 which is fixed to the shaft 17, as described above, fixedly carries, instead of the driving gear 40, a plate 56 which at its outer surface which is visible to the operator carries a plate 57 on which are the indicia indicated by the index 57a and the exposure time setting graduations 60 and 125 apparent from FIGS. 9A and 9B. Just behind the plate 57 which is fixed to the plate 56 which rotates together with the gear 39, this plate 56 is formed with a slot 56a which receives a transmission member 59 of the clutch means. The plate 56 forms one clutch member and the manually engageable member 58 forms another clutch member to which motion is transmitted by the clutch means when the latter is in the engaged position shown in FIG. 9C by way of the member 59. Thus, as long as the member 59 which is fixed to the clutch member 58 is in the slot 56a, the clutch is in its engaged position shown in FIG. 9C. The rotary movement of the gear 39 will thus be transmitted to the driving gear 40 which is fixed to the manually operable clutch member 58 and which meshes with the driven gear 42 which, as referred to above, is fixed to the rotary tube 42b. The sleeve 41 which is fixed to the plate 53a and which receives and supports for rotary movement the shaft extending between the gear 39 and the plate 56 is surrounded by a coil spring 72 which at one end presses against a shoulder at the exterior of the clutch member 58. Thus, the coil spring 72 when in its expanded position of FIG. 9C maintains the clutch means 56, 58, 59 in its engaged position shown in FIG. 9C. The clutch member 58 is formed with an aperture 58b which is closed by a leaf spring 70 carried in the manner shown most clearly in FIG. 9E at the exterior of the clutch member 58, and this leaf spring 70 serve to retain in the aperture 58b a ball member 71 which in the engaged position of the clutch means shown in FIG. 9C is located above a flange or lip 41a projecting outwardly from the sleeve 41. The clutch member 58 has an outer portion situated outwardly beyond a cover plate 63 fragmentarily shown in FIG. 9, this cover plate 63 being carried by the camera in any suitable way and being formed with an opening through which the clutch member 58 can freely extend in the manner shown in FIGS. 9C and 9D. This outer part of the clutch member 58 forms a manually operable means accessible to the operator for displacing the clutch means between its engaged and disengaged positions respectively shown in FIGS. 9C and 9D. When the clutch member 58 has with respect to the stationary sleeve 41 the angular position shown in FIG. 9E, the ball 71 will be capable of moving through an interruption 41b formed in the lip 41a. For this purpose the stationary cover plate 63 carries an index formed by a dot 63a. The end peripheral surface of the manually operable means 58 carries a corresponding mark 58a shown in FIG. 9A. When this mark 58a is aligned with the index dot 63a, the ball 71 is aligned with the interruption 41b in the lip 41a, and thus in this position of the clutch the operator can depress the manually operable means 58 in opposition to the spring 72 so as to place the clutch in a disengaged position shown in FIG. 9D. With the clutch thus located in its disengaged position the operator can turn the clutch member 58 so that the mark 58a will be displaced away from the index 57a either into alignment with the graduation 60 or into alignment with the graduation 125 in order to provide either shutter opening which will produce an exposure time of 1/60 sec. or a shutter opening which will provide an exposure time of 1/125 sec. Thus, with this construction when the clutch means is engaged as shown in FIGS. 9A and 9C, the mark 58a and the index 57a will have the position shown in FIG. 9A with respect to each other, and at this time the structure as described above will operate automatically to provide for each aperture size a given size of the shutter opening, as described above. However, when it is desired to set the shutter speed manually, the operator need only turn the manually operable means 58 to the position shown in FIG. 9A, and then the member 58 can be depressed to the position of FIG. 9D, whereupon the operator can turn the member 58 so as to provide either a manually selected exposure time of 1/60 sec. or a manually selected exposure time of 1/125 sec. Thus, the clutch means of the invention when it is in its disengaged position serves to separate the part of the transmission means extending from the gear 39 to the shaft 17 from the part thereof which extends from the gear 40 to the shutter-adjusting means, and thus this latter part of the transmission means may be manually operated when the clutch means is disengaged. Of course, even with the clutch means disengaged as shown in FIG. 9D the structure for automatically setting the diaphragm will operate, but it is possible to manually set the shutter opening.

As long as the ball member 71 has been displaced to the position shown in FIG. 9D and then turned during movement of the mark 58a into alignment with the graduation 60 or the graduation 125, the ball will remain out of line with the interruption 41b and the clutch will be maintained in its disengaged position irrespective of any rotary movement of the gear 39 together with the clutch member 56. In order to reengage the clutch means, the operator will turn the clutch member 58 so that the mark 58a thereof is again in alignment with the stationary dot 63a on the cover 63, and thus the ball will be placed in alignment with the interruption 41b so that the spring 72 can expand toward the position shown in FIG. 9C. If it should happen that the pin 59 is not immediately received in the opening or slot 56a, the operator need only continue to turn the member 58 until the pin 59 snaps into the opening 56a, and thus the parts will again have the position shown in FIG. 9C where the clutch is engaged to provide the automatic adjustment of the shutter as set forth above.

While a specific structure has been set forth above and shown in the drawings, it will be understood that variations are possible. For example the transmission means can take different forms and the light-responsive means can be placed ahead of the diaphragm means and the helical slots can be differently positioned.

It will be noted that the structure of the invention is relatively simple and is inexpensive to manufacture and assemble. With the structure of the invention the images to which the film is exposed will have almost no possibility of deteriorating as a result of diffraction of the incident light, and in addition accurate exposures even with a high degree of brightness can be achieved.

It is to be noted that light, after travelling through the objective, is reflected by surface 24a of the shutter means to the light-responsive means 37 by way of the condensing lenses 34 and 36 and the reflecting mirror 35 only during that part of each revolution of the shutter means when the travel of light to the film is blocked by the shutter means. Whenever the adjusted opening of the shutter means extends across the optical axis light will reach the film and will not be reflected by the surface 24a to the light-responsive means 37.

What is claimed is:

1. In a motion picture camera, adjustable diaphragm means, drive means operatively connected to said adjustable diaphragm means for adjusting the latter, light-responsive means operatively connected with said drive means for actuating the latter to adjust said diaphragm means in response to changes in lighting conditions, rotary shutter means formed with an opening through which film is exposed at each revolution of said shutter means, adjusting means operatively connected with said rotary shutter means for adjusting the size of said opening thereof, and transmission means operatively connected on the one hand with said drive means and on the other hand with said adjusting means for actuating the latter to adjust said opening of said shutter means when said drive means is actuated to adjust said diaphragm means.

2. The combination of claim 1 and wherein a clutch means is included in said transmission means and has an engaged position interconnecting a part of said transmission means which extends from said drive means with a part of said transmission means which extends to said adjusting means, and manually operable means operatively connected with said clutch means for placing the latter in a disengaged position separating said parts of said transmission means from each other and rendering the part of said transmission means which extends to said adjusting means manually operable for manual adjustment of said opening of said rotary shutter means.

3. The combination of claim 1 and wherein a compensating means is situated in the path of light travelling to said light-responsive means for altering the amount of light received thereby, said transmission means being operatively connected with said compensating means for actuating the latter simultaneously with said adjustable diaphragm means and said adjusting means to alter the amount of light received by said light-responsive means in response to operation of said drive means.

4. The combination of claim 1 and wherein said rotary shutter means includes a rotary shutter formed at its periphery with an arcuate shutter opening extending through a given angle, said adjusting means including an adjusting plate coaxial with said rotary shutter and turnable with respect thereto for covering said opening to a given extent for adjusting the size of the shutter opening, a pair of telescoped tubes coaxial with said shutter and adjusting plate and respectively fixed thereto, one of said tubes being formed with an axial slot and the other of said tubes being formed with a helical slot extending across said axial slot, a transverse pin extending through both of said slots, and a plunger carrying said pin and axially movable within the inner one of said telescoped tubes for displacing said pin with respect to said slots for turning said adjusting plate with respect to said shutter, said transmission means being operatively connected with said pin for axially displacing the latter to adjust the angular position of said shutter and adjusting plate one with respect to the other.

5. The combination of claim 4 and wherein a rotating means is operatively connected with the outer one of said telescoped tubes for rotating both of said tubes together with said shutter and adjusting plate as a unit, and said plunger and transverse pin also rotating together with said telescoped tubes and said shutter and adjusting plate, said transmission means including a connecting means operatively connected with said plunger for controlling the axial position of the latter while freeing said plunger for free rotary movement with respect to said transmission means.

6. The combination of claim 5 and wherein said connecting means includes a portion of said plunger which is formed with an annular groove and an output member of said transmission means having a portion situated in said groove so that said plunger will move axially in response to movement of said portion of said output member axially of said plunger while the latter is free to rotate with respect to said portion of said output member.

7. The combination of claim 6 and wherein said output member of said transmission means is in the form of a slide block having at its periphery a flange extending into said groove of said plunger and thus forming said portion of said output member of said transmission means, a rotary tube on which said slide block is axially slidable, said rotary tube extending parallel to said plunger, an inner member extending along the interior of said rotary tube and supporting the latter for rotation, said inner member and rotary tube forming a pair of members one of which is formed with an axial cutout and the other of which is formed with a helical cutout extending across the axial cutout, said slide block carrying a transverse pin extending into both of said cutouts so that in response to rotary movement of said rotary tube said slide block will be axially shifted to transmit axial movement to said plunger for determining the angular position of said adjusting plate and shutter one with respect to the other, said transmission means including a driven gear fixed to said rotary tube and a drive gear meshing with said driven gear for rotating the latter and said rotary tube therewith when said drive means operates.

8. The combination of claim 7 and wherein said transmission means includes a clutch means for transmitting rotation from said drive means to said driving gear, said clutch means including a pair of clutch members one of which is fixed with said driving gear and the other of which is operatively connected with said drive means to rotate whenever said drive means operates, said clutch means including a motion-transmitting element for transmitting motion between said clutch members when said clutch means is in an engaged position, and manually operable means operatively connected with said one clutch member for displacing the latter to a disengaged position with respect to said other clutch member where said motion-transmitting member no longer transmits motion between said clutch members, said manually operable means being operatively connected with said driving gear so that the latter may be rotated manually when said clutch means is in its disengaged position, thus permitting said adjusting plate and shutter to be manually adjusted one with respect to the other when said clutch means is in its disengaged position.

9. The combination of claim 1 and wherein said drive means includes a servomotor electrically connected with said light-responsive means for being controlled by the latter to operate said drive means.

10. The combination of claim 1 and wherein the camera includes an objective through which light travels to the interior of the camera, and light-directing means receiving light from said objective except when said opening of said shutter permits light to travel from the objective to film which is to be exposed and for directing the light after it has travelled through said objective to said light-responsive means for actuating the latter.

11. The combination of claim 1 and wherein said transmission means is operatively connected with said adjustable means for providing at said rotary shutter means exposure times which have a predetermined relationship with respect to the F-number settings of said diaphragm means.

12. The combination of claim 11 and wherein said relationship provides an exposure time of 1/125 sec. at an F-number setting of 16.

* * * * *

UNITED STATES PATENT OFFICE
CERTIFICATE OF CORRECTION

Patent No. 3,787,116                    Dated January 22, 1974

Inventor(s)  Tatsuro Shimizu

It is certified that error appears in the above-identified patent and that said Letters Patent are hereby corrected as shown below:

In the heading, between items [21] and [52] insert:

>    [30] Foreign Application Priority Data
>         December 10, 1971 Japan.....1971-99904

Signed and sealed this 18th day of June 1974.

(SEAL)
Attest:

EDWARD M. FLETCHER, JR.                C. MARSHALL DANN
Attesting Officer                      Commissioner of Patents